United States Patent
Suzuki (10) Patent No.: US 8,902,387 B2
(45) Date of Patent: Dec. 2, 2014

(54) LIQUID CRYSTAL DISPLAY PANEL AND LIQUID CRYSTAL DISPLAY

(75) Inventor: Teruaki Suzuki, Beijing (CN)

(73) Assignee: Boe Technology Group Co., Ltd., Beijing (CN)

( * ) Notice: Subject to any disclaimer, the term of this patent is extended or adjusted under 35 U.S.C. 154(b) by 75 days.

(21) Appl. No.: 13/700,089

(22) PCT Filed: Sep. 5, 2012

(86) PCT No.: PCT/CN2012/081017
§ 371 (c)(1),
(2), (4) Date: Nov. 26, 2012

(87) PCT Pub. No.: WO2013/034077
PCT Pub. Date: Mar. 14, 2013

(65) Prior Publication Data
US 2013/0107167 A1     May 2, 2013

(30) Foreign Application Priority Data
Sep. 6, 2011  (CN) .......................... 2011 1 0262823

(51) Int. Cl.
  G02F 1/1337   (2006.01)
  G02F 1/1343   (2006.01)
(52) U.S. Cl.
  CPC ............ G02F 1/1337 (2013.01); G02F 1/1343 (2013.01)
  USPC ....................................... 349/130
(58) Field of Classification Search
  USPC ................................. 349/129–130
  See application file for complete search history.

(56) References Cited

U.S. PATENT DOCUMENTS

| | | |
|---|---|---|
| 2004/0263749 A1 | 12/2004 | Jeong et al. |
| 2007/0146606 A1 | 6/2007 | Yamashita |
| 2008/0018844 A1 | 1/2008 | Song |
| 2009/0021660 A1 | 1/2009 | Lu et al. |
| 2009/0109356 A1 | 4/2009 | Kitagawa |
| 2012/0013594 A1 | 1/2012 | Ishihara et al. |

FOREIGN PATENT DOCUMENTS

| | | |
|---|---|---|
| CN | 1991466 A | 7/2007 |
| CN | 101387806 A | 3/2009 |
| CN | 101424852 A | 5/2009 |
| CN | 101487964 A | 7/2009 |
| JP | 11-231344 A | 8/1999 |

(Continued)

OTHER PUBLICATIONS

First Chinese Office Action dated Aug. 1, 2013; Appln. No. 201110262823.8.
International Search Report; mailed Nov. 22, 2012; PCT/CN2012/081017.

(Continued)

Primary Examiner — Phu Vu
(74) Attorney, Agent, or Firm — Ladas & Parry LLP (57) ABSTRACT

A liquid crystal display panel and a liquid crystal display are disclosed. The liquid crystal display panel comprises: a first substrate and a second substrate, disposed opposite to each other to form a cell, as well as a liquid crystal layer between the two substrates. On the first substrate, there is formed with a first common electrode and a pixel electrode, arranged at an interval; on the second substrate, there is formed with a set of layers, the set of layers comprising: a second common electrode, and a dielectric layer covering one side of the second common electrode facing the first substrate; and the structure of the set of layers is different at a position directly opposite to the first common electrode from that at a position directly opposite to the pixel electrode.

18 Claims, 5 Drawing Sheets

(56) References Cited

FOREIGN PATENT DOCUMENTS

| JP | 2010-015183 A | 1/2010 |
| KR | 20040061447 A | 7/2004 |
| KR | 20040091184 A | 10/2004 |
| WO | 2010/137217 A1 | 12/2010 |

OTHER PUBLICATIONS

Korean Office Action dated Jan. 28, 2014; Appln. No. 10-2012-7031056.
International Preliminary Report on Patentability dated Mar. 12, 2014; PCT/CN2012/081017.
Korean Notice of Allowance dated May 20, 2014; Appln. No. 10-2012-7031056.

LIQUID CRYSTAL DISPLAY PANEL AND LIQUID CRYSTAL DISPLAY

CROSS REFERENCE TO RELATED APPLICATIONS

This application is a national stage application under 35 U.S.C. 371 and claims the benefit of PCT Application No. PCT/CN2012/081017 having an international filing date of Sep. 5, 2012, which designated the United States, which PCT application claimed the benefit of Chinese Application No. 201110262823.8 filed Sep. 6, 2011, the disclosure of both the above-identified applications are incorporated herein by reference.

TECHNICAL FIELD

The present disclosure relates to a liquid crystal display panel and a liquid crystal display.

BACKGROUND

Figure 1:
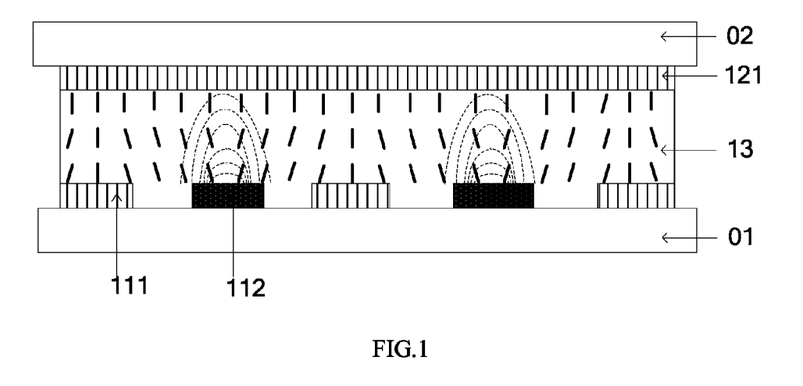
FIG. 1 is a schematic view of a liquid crystal display panel in the prior art.

As shown in FIG. 1, a vertical alignment (VA) liquid crystal display panel comprises: an array substrate 01 and a color-filter substrate 02, disposed opposite to each other to form a cell, as well as a liquid crystal layer 13 between the two substrates; the liquid crystal molecules in the liquid crystal layer 13 is arranged vertically.

With reference to the VA liquid crystal display panel shown in FIG. 1, on the array substrate 01, there are formed with a first common electrode 111 and a pixel electrode 112, and both the electrodes 111, 112 are arranged at an interval; on the color-filter substrate 02, there is formed with a second common electrode 121. When power is supplied, oblique electric fields are formed among the three electrodes, the liquid crystal molecules under the effect of the two electric fields deviate from their vertical positions to be in a tilted manner, so that the liquid crystal display panel is enabled to let light pass; however, a part of the liquid crystal molecules in the upper-layer (the liquid crystal layer near the color-filter substrate)—because the distance from the pixel electrode is large and thus the electric force is reduced—deviate from their vertical positions by smaller angles, and this will lead to a lower light-transmittance of the liquid crystal display panel.

Figure 2:
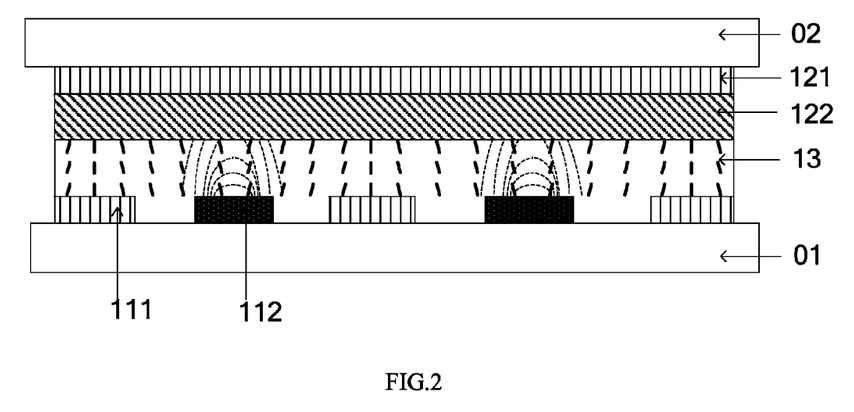
FIG. 2 is a schematic view of another liquid crystal display panel in the prior art.

In order to improve the light-transmittance of such liquid crystal display panel, as shown in FIG. 2, in the prior art, if the thickness of the liquid crystal display panel is unchanged, a transparent dielectric layer 122 is formed on the color-filter substrate to cover the second common electrode 121. The dielectric layer 122 can increase the proportion of the horizontal electric field with respect to the vertical electric field, so that the tilt degrees of the liquid crystal molecules are increased, thereby improving the light-transmittance of the panel to a certain extent. The present disclosure provides another scheme of a liquid crystal display panel.

SUMMARY

According to the embodiments of the present disclosure, there is provided a liquid crystal display panel, comprising: a first substrate and a second substrate, disposed opposite to each other to form a cell, as well as a liquid crystal layer between the two substrates. On the first substrate, there is formed with a first common electrode and a pixel electrode, arranged at an interval. On the second substrate, there is formed with a set of layers, the set of layers comprising: a second common electrode, and a dielectric layer covering one side of the second common electrode facing the first substrate. The structure of the set of layers is different at a position directly opposite to the first common electrode from that at a position directly opposite to the pixel electrode.

In some examples, the structure of the set of layers being different at a position directly opposite to the first common electrode from that at a position directly opposite to the pixel electrode comprises the case in which:

the dielectric layer in the set of layers comprises: a first dielectric unit and a second dielectric unit, arranged at an interval and closely linked to each other; the first dielectric unit is located at a position directly opposite to the first common electrode, and the second dielectric unit is located at a position directly opposite to the pixel electrode; and the dielectric constant of the first dielectric unit is greater than that of the second dielectric unit.

Preferably, a width of the first dielectric unit is consistent with a width of the second dielectric unit.

In some other examples, the structure of the set of layers being different at a position directly opposite to the first common electrode from that at a position directly opposite to the pixel electrode comprises the case in which:

on the second common electrode in the set of layers, there is formed with a slit, and the slit is located at a position directly opposite to the pixel electrode.

Preferably, a width of the slit is consistent with a width of the pixel electrode.

In some further examples, the structure of the set of layers being different at a position directly opposite to the first common electrode from that at a position directly opposite to the pixel electrode comprises the case in which:

the second common electrode in the set of layers is in a concave-convex shape, the distance between a concave-shaped portion of the second common electrode and the first substrate is smaller than the distance between a convex-shaped portion of the second common electrode and the first substrate; and the concave-shaped portion of the second common electrode is located at a position directly opposite to the first common electrode, and the convex-shaped portion of the second common electrode is located at a position directly opposite to the pixel electrode.

Preferably, a width of the concave-shaped portion of the second common electrode is consistent with a width of the first common electrode.

Furthermore, the convex-shaped portion of the second common electrode may be formed with a slit, and the slit is located at a position directly opposite to the pixel electrode. Preferably, a width of the slit is consistent with a width of the pixel electrode.

According to some other embodiments of the present disclosure, there is provided a liquid crystal display comprising: a liquid crystal display panel as previously described, and a backlight source providing backlight for the liquid crystal display panel.

In the liquid crystal display panel and the liquid crystal display provided by the embodiments of the present disclosure, the structure of the set of layers is different at a position directly opposite to the first common electrode from that at a position directly opposite to the pixel electrode, so that the liquid crystal molecules in the liquid crystal layer—after being supplied with power—deviate from their vertical positions under the effect of electric fields, enabling the liquid crystal display panel to be light-transmissive, and thereby realizing the display function of the liquid crystal display panel.

BRIEF DESCRIPTION OF THE DRAWINGS

In order to clearly illustrate the technical solutions in the embodiments of the present disclosure or in the prior art, the drawings needed in describing the embodiments or the prior art will be briefly described in the following; it is obvious that the drawings described as follows are merely some embodiments of the present disclosure. Based on these accompany drawings, those ordinary skilled in the art can obtain other drawings, without any inventive work.

REFERENCE NUMERALS

01—Array substrate, 02—Color-filter substrate;
11—First substrate, 12—Second substrate, 13—Liquid crystal layer;
111—First common electrode, 112—Pixel electrode, 121—Second common electrode, 122—Dielectric layer;
31—Slits on the second common electrode, 41—Concave-shaped portion of second common electrode, 42—Convex-shaped portion of second common electrode, 43—Slits on the convex-shaped portion of second common electrode, 61—First dielectric unit, 62—Second dielectric unit.

DETAILED DESCRIPTION

Below, the technical solutions in the embodiments of the present disclosure will be described in a clearly and fully understandable way, in connection with the accompanying drawings in the embodiments of the present disclosure. It is obvious that, the described embodiments are only a part but not all of the embodiments of the present disclosure. Based on the embodiments in the present disclosure, those ordinary skilled in the art can obtain all other embodiment(s), without any inventive work, which should belong to the protection scope as claimed.

The liquid crystal display panels in all embodiments of the present disclosure may be VA-IPF liquid crystal display panels. Among them, before a VA liquid crystal display panel being supplied with power, the liquid crystal molecules are arranged vertically. IPF (In-Plane Field) refers to the case in which a liquid crystal display panel mainly utilizes a horizontal electric field to drive liquid crystal molecules to deflect in a vertical plane so as to achieve the light-transmission of the panel and thus the display function of the panel. The present disclosure refers to a liquid crystal display panel with these two features of both VA and IPF as a VA-IPF liquid crystal display panel.

First Embodiment

Figure 3:
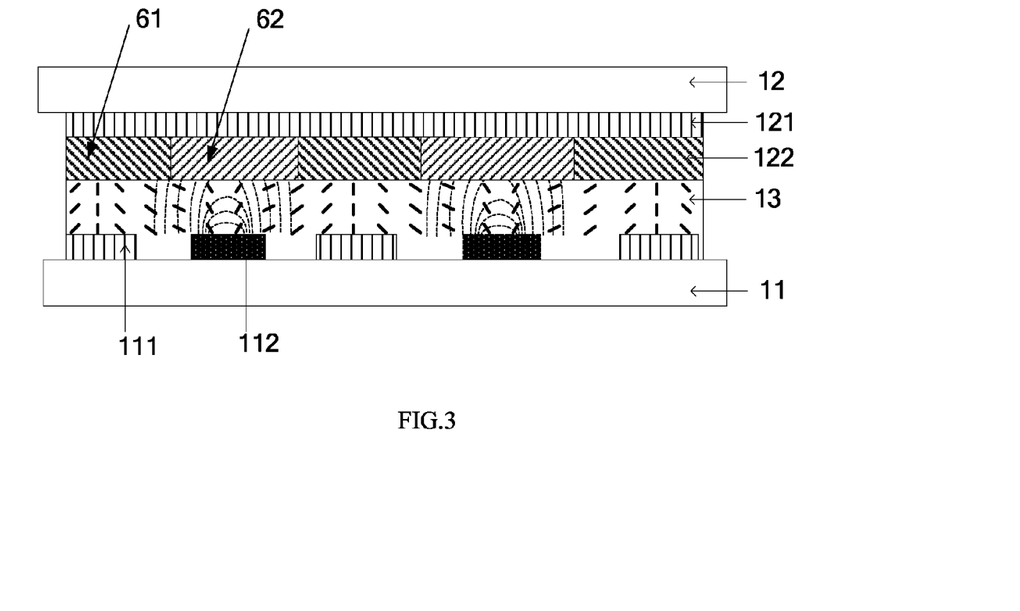
FIG. 3 is a schematic view of a liquid crystal display panel provided in the first embodiment.

As shown in FIG. 3, this embodiment provides a liquid crystal display panel, which comprises: a first substrate 11 and a second substrate 12, disposed opposite to each other to form a cell, as well as a liquid crystal layer 13 between the two substrates. On the first substrate, there is formed with a first common electrode 111 and a pixel electrode 112, arranged at an interval. On the second substrate, there is formed with a set of layers, the set of layers comprising: a second common electrode 121 and a dielectric layer 122 covering the side of the second common electrode 121 facing the first substrate 11. The structure of the set of layers is different at a position directly opposite to the first common electrode 111 from that at a position directly opposite to the pixel electrode 112.

Typically, the first substrate is an array substrate, and the second substrate is a color-filter substrate.

Among them, in the case of the liquid crystal display panel being supplied with power, the voltage applied to the first common electrode 111 is consistent with the voltage applied to the second common electrode 121; and the pixel electrode 112 is typically connected with a drain of a thin film transistor in the pixel structure on the first substrate.

Typically, the first common electrode 111, the second common electrode 121 and the pixel electrode 112 are all made of the material of indium-tin oxide (ITO).

Preferably, the structure of the set of layers being different at a position directly opposite to the first common electrode 111 from that at a position directly opposite to the pixel electrode 112, comprises the following cases.

The dielectric layer 122 in the set of layers comprises: a first dielectric unit 61 and a second dielectric unit 62, arranged at an interval and closely linked to each other; the first dielectric unit 61 is located at a position directly opposite to the first common electrode 111, and the second dielectric unit 62 is located at a position directly opposite to the pixel electrode 112; and the dielectric constant of the first dielectric unit 61 is greater than that of the second dielectric unit 62.

In this embodiment, the first dielectric unit 61 with a larger dielectric constant is located at a position directly opposite to the first common electrode 111, and the second dielectric unit 62 with a smaller dielectric constant is located at a position directly opposite to the pixel electrode 112. According to theoretical knowledge of physics, it can be known that: a dielectric will change the intensity of an electric field; thus, when a dielectric with a high dielectric constant is placed in an electric field, the electric field intensity will have a certain amount of decrease comparatively; the higher the dielectric constant of the dielectric is, more notable the effect on the electric filed becomes. Therefore, electric field intensity at the location of the first dielectric unit 61 with a larger dielectric constant is less than that at the location of the second dielectric unit 62 with a smaller dielectric constant. Since the electric field intensity between the second common electrode 121 and the first common electrode 111 as well as between the second common electrode 121 and the pixel electrode 112 is constant, in the liquid crystal layer the electric field intensity corresponding to the location of the first dielectric unit 61 is greater than that of the second dielectric unit 62. Since an electric force is directly proportional to an electric field intensity, the electric force formed between the pixel electrode 112 and a portion of the second common electrode 121 corresponding to the first dielectric unit 61 is greater than the electric force formed between the pixel electrode 112 and a portion of the second common electrode 121 corresponding to the second dielectric unit 62. Thus an oblique electric field is formed in the liquid crystal layer, so that the liquid crystal molecules in the liquid crystal layer when power is supplied deviate from their vertical positions by a larger tilt angle with respect to the prior art, which further improves the light-transmittance of the liquid crystal display panel.

Further preferably, the width of the first dielectric unit 61 is consistent with the width of the second dielectric unit 62. In the present disclosure, "width" refers to a minimum profile dimension of a structural feature in a direction parallel to a substrate plane.

Second Embodiment

Figure 4:
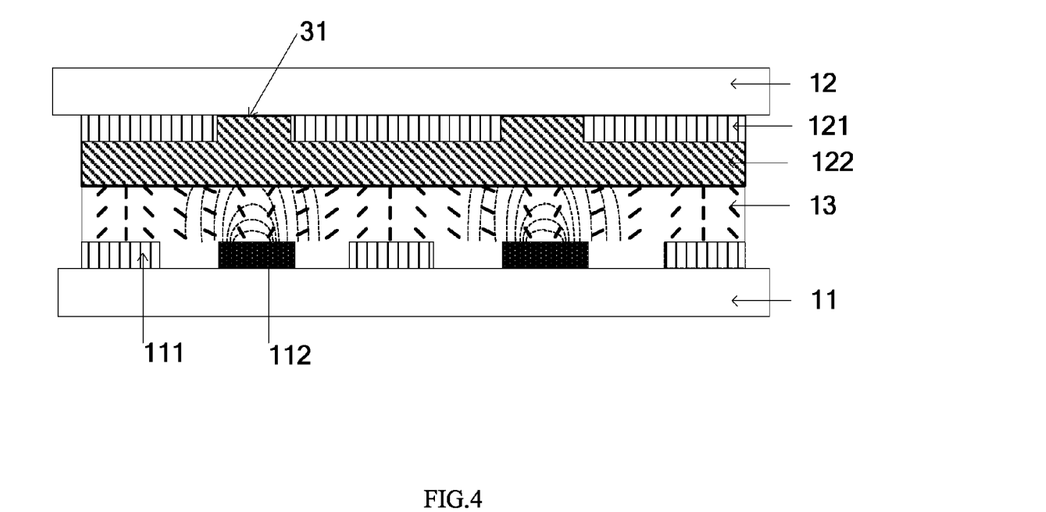
FIG. 4 is a schematic view of a liquid crystal display panel provided in the second embodiment.

As shown in FIG. 4, this embodiment provides a liquid crystal display panel, which comprises: a first substrate 11 and a second substrate 12, disposed opposite to each other to form a cell, as well as a liquid crystal layer 13 between the two substrates. On the first substrate, there is formed with a first common electrode 111 and a pixel electrode 112, arranged at an interval. On the second substrate, there is formed with a set of layers, the set of layers comprising: a second common electrode 121, and a dielectric layer 122 covering the side of the second common electrode 121 facing the first substrate 11. The structure of the set of layers is different at a position directly opposite to the first common electrode 111 from that at a position directly opposite to the pixel electrode 112.

Typically, the first substrate is an array substrate, and the second substrate is a color-filter substrate.

Among them, in the case of the liquid crystal display panel being supplied with power, the voltage applied to the first common electrode 111 is consistent with the voltage applied to the second common electrode 121; and moreover, each pixel electrode 112 is typically connected with a drain of a thin film transistor in the pixel structure on the first substrate.

The electric fields comprise: a horizontal electric field, formed between the first common electrode 111 and the second common electrode 121 as well as between the first common electrode 111 and the pixel electrode 112; and a vertical electric field, formed between the pixel electrode 112 and the second common electrode 121.

Typically, the first common electrode 111, the second common electrode 121 and the pixel electrode 112 are all made of the material of indium-tin oxide (ITO).

It should be noted that, in the drawings of all embodiments of the present disclosure, only the layer structures related to the technology of this disclosure are shown, whereas the layer structures unrelated to the technology of this disclosure are not shown; however, those skilled in the art can have a clear and unambiguous understanding of the technical solutions provided by the present disclosure, based on the description of the embodiments in the present disclosure and the prior art.

In the liquid crystal display panel provided by this embodiment, the structure of the set of layers is different at a position directly opposite to the first common electrode 111 from that at a position directly opposite to the pixel electrode 112, so that the liquid crystal molecules under the effect of electric fields deviate from their vertical positions, enabling the liquid crystal display panel to be light-transmissive, and thereby realizing the display function of the liquid crystal display panel.

Preferably, the structure of the set of layers being different at a position directly opposite to the first common electrode 111 from that at a position directly opposite to the pixel electrode 112, comprises the case in which: on the second common electrode 121 in the set of layers, there is formed with a slit 31, and the slit 31 is located at a position directly opposite to the pixel electrode 112.

In the scheme provided by this embodiment, the second common electrode 121 is formed with a slit 31 at a position directly opposite to the pixel electrode 112, in such a way that—in the case of power being supplied—the electric force between the pixel electrode 112 and the slit 31 is reduced. Meanwhile, with respect to the liquid crystal display panel shown in FIG. 2, as the electric field formed between the pixel electrode 112 and the second common electrode 121 corresponding to the first common electrode 111 is not weakened, the oblique electric field formed between the pixel electrode 112 and the second common electrode 121 corresponding to the first common electrode 111 is therefore increased. This makes the alignment direction of the liquid crystal molecules in the liquid crystal layer under the effect of the two electric fields deviate from a vertical position by a larger tilt angle with respect to the prior art, which further improves the light-transmittance of the liquid crystal display panel, and thereby enhancing the display effect of the liquid crystal display panel.

Further preferably, the width of the slit is consistent with the width of the pixel electrode 112.

Figure 5:
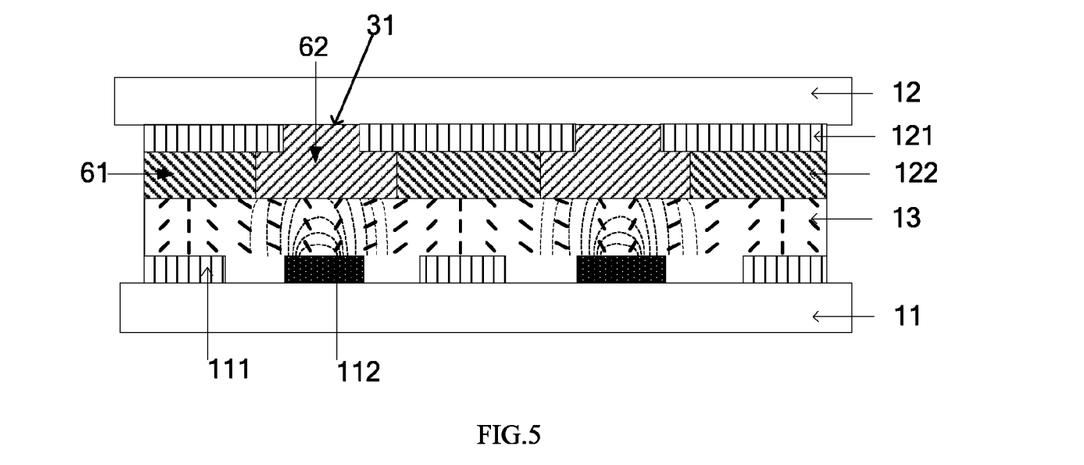
FIG. 5 is a schematic view of another liquid crystal display panel provided in the second embodiment.

Further, this embodiment may incorporate the scheme in the first embodiment. As shown in FIG. 5, preferably the structure of the set of layers being different at a position directly opposite to the first common electrode 111 from that at a position directly opposite to the pixel electrode 112, comprises the case in which:

The dielectric layer 122 in the set of layers comprises: a first dielectric unit 61 and a second dielectric unit 62, arranged at an interval and closely linked to each other; wherein, the first dielectric unit 61 is located at a position directly opposite to the first common electrode 111, and the second dielectric unit 62 is located at a position directly opposite to the pixel electrode 112; and moreover, the dielectric constant of the first dielectric unit 61 is greater than that of the second dielectric unit 62.

In this way, on the basis of the liquid crystal display panel shown in FIG. 4, the light-transmittance of the liquid crystal display panel can be further improved.

Third Embodiment

Figure 6:
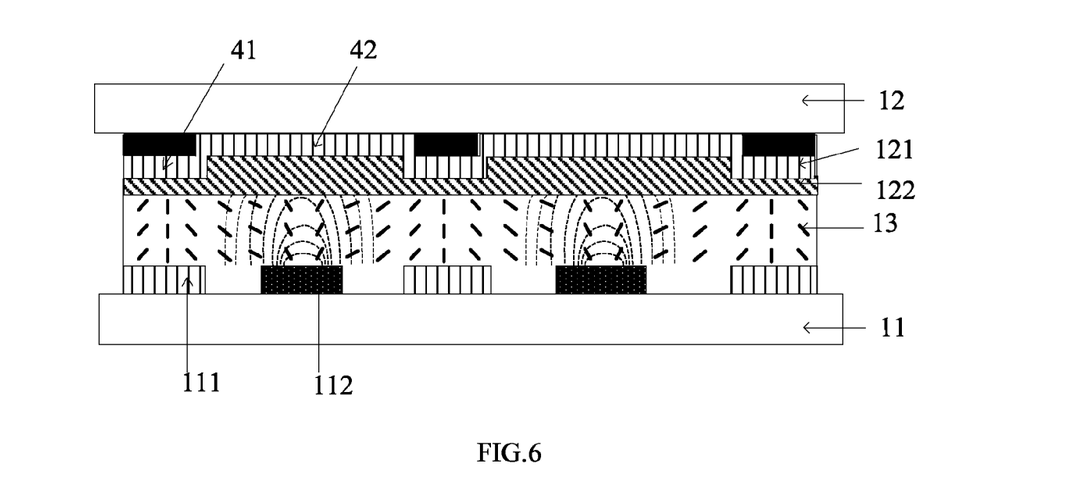
FIG. 6 is a schematic view of a liquid crystal display panel provided in the third embodiment.

As shown in FIG. 6, this embodiment provides a liquid crystal display panel, which comprises: a first substrate 11 and a second substrate 12, disposed opposite to each other to form a cell, as well as a liquid crystal layer 13 between the two substrates. On the first substrate, there is formed with a first common electrode 111 and a pixel electrode 112, arranged at an interval. On the second substrate, there is formed with a set of layers, the set of layers comprising: a second common electrode 121, and a dielectric layer 122 covering the side of the second common electrode 121 facing the first substrate 11. The structure of the set of layers is different at a position directly opposite to the first common electrode 111 from that at a position directly opposite to the pixel electrode 112.

Typically, the first substrate is an array substrate, and the second substrate is a color-filter substrate.

Among them, in the case of the liquid crystal display panel being supplied with power, the voltage applied to the first common electrode 111 is consistent with the voltage applied to the second common electrode 121; and the pixel electrode 112 is typically connected with a drain of a thin film transistor in the pixel structure on the first substrate.

Typically, the first common electrode 111, the second common electrode 121 and the pixel electrode 112 are all made of the material of indium-tin oxide (ITO).

Preferably, the structure of the set of layers being different at a position directly opposite to the first common electrode 111 from that at a position directly opposite to the pixel electrode 112, comprises the case in which:

The second common electrode 121 in the set of layers is in a concave-convex shape, wherein the distance between a concave-shaped portion 41 of the second common electrode 121 and the first substrate is smaller than the distance between a convex-shaped portion 42 of the second common electrode 121 and the first substrate; and moreover, the concave-shaped portion 41 of the second common electrode 121 is located at a position directly opposite to the first common electrode 111, and the convex-shaped portion 42 of the second common electrode 121 is located at a position directly opposite to the pixel electrode 112.

Among them, the method for making the second common electrode in a concave-convex shape, may be as shown in FIG. 6, which can be done as below: at the locations of the concave-shaped portions of the second common electrode on the second substrate, firstly an insulating substance is used to form a stripe with a certain thickness (represented by the pure black blocks in FIG. 6), and then the second common electrode is formed thereon.

In this embodiment, the concave-shaped portion of the second common electrode is located at a position directly opposite to the first common electrode, and the convex-shaped portion of the second common electrode is located at a position directly opposite to the pixel electrode, which makes the distance between the pixel electrode 112 and the concave-shaped portion 41 on the second common electrode 121 less than the distance between the pixel electrode 112 and the convex-shaped portion 42. Thus, with respect to the liquid crystal display panel shown in FIG. 2, the oblique electric field formed by the second common electrode and the pixel electrode is increased, so that the alignment direction of the liquid crystal molecules in the liquid crystal layer deviate from a vertical position by a larger tilt angle with respect to the prior art, which further improves the light-transmittance of the liquid crystal display panel, and thereby enhancing the display effect of the liquid crystal display panel.

Further preferably, the width of the concave-shaped portion 41 of the second common electrode 121 is consistent with the width of the first common electrode 111.

On the basis of the liquid crystal display panel shown in FIG. 6, the light-transmittance of the liquid crystal display panel can be further improved by adopting the following two ways.

Figure 7:
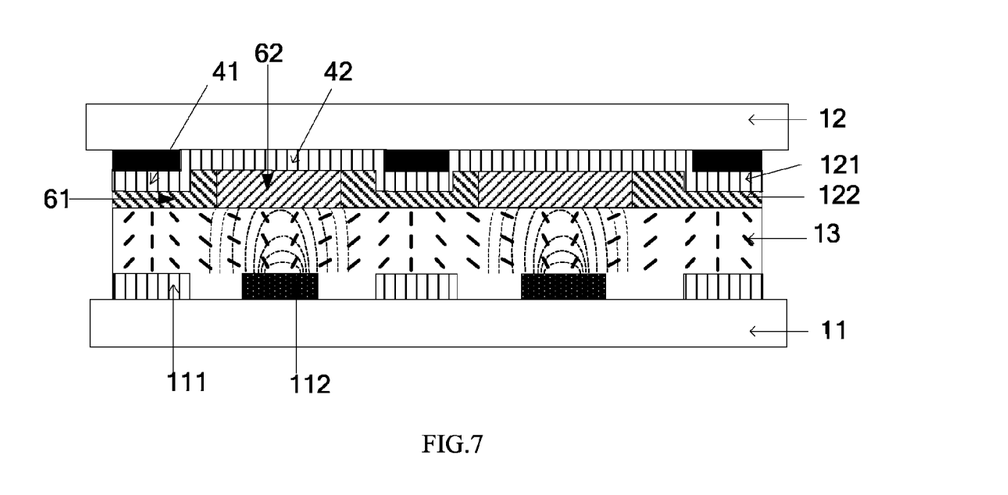
FIG. 7 is a schematic view of a liquid crystal display panel provided in the third embodiment in the first implementation.

The first way: as shown in FIG. 7, based on the liquid crystal display panel shown in FIG. 6, the structure of the set of layers being different at a position directly opposite to the first common electrode 111 from that at a position directly opposite to the pixel electrode 112, further comprises the case in which:

The dielectric layer 122 in the set of layers comprises: a first dielectric unit 61 and a second dielectric unit 62, arranged at an interval and closely linked to each other; wherein, the first dielectric unit 61 is located at a position directly opposite to the first common electrode 111, and the second dielectric unit 62 is located at a position directly opposite to the pixel electrode 112; and the dielectric constant of the first dielectric unit 61 is greater than that of the second dielectric unit 62.

In this way, on the basis of the liquid crystal display panel shown in FIG. 6, the light-transmittance of the liquid crystal display panel can be further improved.

Figure 8:
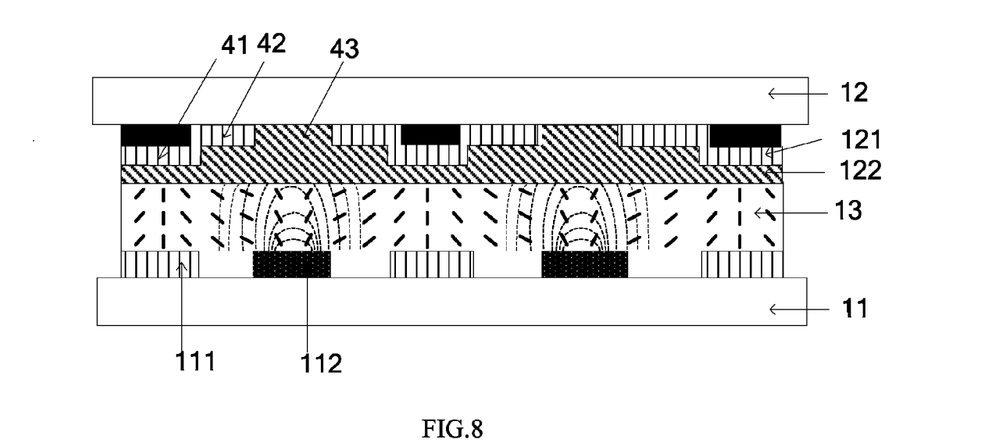
FIG. 8 is a schematic view of a liquid crystal display panel provided in the third embodiment in the second implementation.

The second way: as shown in FIG. 8, based on the liquid crystal display panel shown in FIG. 6, the convex-shaped portion 42 of the second common electrode 121 is further formed with a slit 43, and the slit 43 is located at a position directly opposite to the pixel electrode 112. This scheme incorporates the scheme provided with a slit in the second embodiment, which makes the oblique electric field formed by the second common electrode 121 and the pixel electrode 112 further increased, so that the alignment direction of the liquid crystal molecules in the liquid crystal layer deviate from a vertical position by a larger tilt angle with respect to the prior art, which further improves the light-transmittance of the liquid crystal display panel.

Further preferably, the width of the slit 43 is consistent with the width of the pixel electrode 112.

Figure 9:
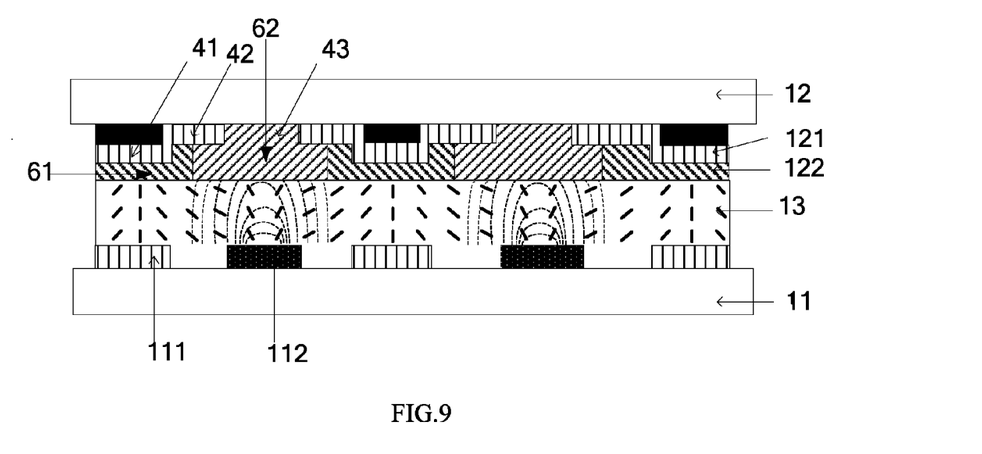
FIG. 9 is a schematic view of another liquid crystal display panel provided in the third embodiment in the second implementation.

In addition, for further improving the light-transmittance of the liquid crystal display panel, further preferably, as shown in FIG. 9, based on the liquid crystal display panel shown in FIG. 6, both the first way and the second way as described above can be adopted at the same time, so as to improve the light-transmittance of the liquid crystal display panel as much as possible. It should be noted that, the first implementation and the second implementation take the above description for reference, which is no more explained here.

An embodiment of the present disclosure further provides a liquid crystal display, which comprises a liquid crystal display panel, and a backlight source providing backlight for the liquid crystal display panel; the liquid crystal display panel may be any one of the liquid crystal display panels described above in accordance with the embodiments of the present disclosure.

The above description is merely the specific implementation of the present disclosure, and the protection scope of the present disclosure is not limited thereto. In the technical range disclosed by the present disclosure, variations and replacement which can be easily conceived by any skilled who is familiar with the art, should be encompassed by the protection scope of the present disclosed technology. Therefore, the protection scope of the present disclosed technology should be defined by the protection scope of the claims.

The invention claimed is:

1. A liquid crystal display panel, comprising: a first substrate and a second substrate, disposed opposite to each other to form a cell, as well as a liquid crystal layer between the two substrates;

wherein, on the first substrate, there is formed with a first common electrode and a pixel electrode, arranged at an interval; on the second substrate, there is formed with a set of layers, the set of layers comprising: a second common electrode, and a dielectric layer covering one side of the second common electrode facing the first substrate; and wherein, a structure of the set of layers is different at a position directly opposite to the first common electrode from that at a position directly opposite to the pixel electrode, wherein the structure of the set of layers being different at a position directly opposite to the first common electrode from that at a position directly opposite to the pixel electrode comprises a case in which:

the dielectric layer in the set of layers comprises a first dielectric unit and a second dielectric unit, arranged at an interval and closely linked, wherein the first dielectric unit is located at a position directly opposite to the first common electrode, and the second dielectric unit is located at a position directly opposite to the pixel electrode; and the dielectric constant of the first dielectric unit is greater than that of the second dielectric unit.

2. The liquid crystal display panel according to claim 1, wherein, a width of the first dielectric unit is consistent with a width of the second dielectric unit.

3. The liquid crystal display panel according to claim 1, wherein the structure of the set of layers being different at a position directly opposite to the first common electrode from that at a position directly opposite to the pixel electrode comprises a case in which:
   on the second common electrode in the set of layers, there is formed with a slit, and the slit is located at a position directly opposite to the pixel electrode.

4. The liquid crystal display panel according to claim 3, wherein a width of the slit is consistent with a width of the pixel electrode.

5. The liquid crystal display panel according to claim 1, wherein the structure of the set of layers being different at a position directly opposite to the first common electrode from that at a position directly opposite to the pixel electrode comprises a case in which:
   the second common electrode in the set of layers is in a concave-convex shape, wherein a distance between a concave-shaped portion of the second common electrode and the first substrate is smaller than a distance between a convex-shaped portion of the second common electrode and the first substrate; and the concave-shaped portion of the second common electrode is located at a position directly opposite to the first common electrode, and the convex-shaped portion of the second common electrode is located at a position directly opposite to the pixel electrode.

6. The liquid crystal display panel according to claim 5, wherein a width of the concave-shaped portion of the second common electrode is consistent with a width of the first common electrode.

7. The liquid crystal display panel according to claim 5, wherein the convex-shaped portion of the second common electrode is formed with a slit, and the slit is located at a position directly opposite to the pixel electrode.

8. The liquid crystal display panel according to claim 7, wherein a width of the slit is consistent with a width of the pixel electrode.

9. A liquid crystal display comprising: a liquid crystal display panel, and a backlight source providing backlight for the liquid crystal display panel, wherein, the liquid crystal display panel comprising:
   a first substrate and a second substrate, disposed opposite to each other to form a cell, as well as a liquid crystal layer between the two substrates; wherein, on the first substrate, there is formed with a first common electrode and a pixel electrode, arranged at an interval; on the second substrate, there is formed with a set of layers, the set of layers comprising: a second common electrode, and a dielectric layer covering one side of the second common electrode facing the first substrate; and wherein, a structure of the set of layers is different at a position directly opposite to the first common electrode from that at a position directly opposite to the pixel electrode,
   wherein the structure of the set of layers being different at a position directly opposite to the first common electrode from that at a position directly opposite to the pixel electrode comprises a case in which:
   the dielectric layer in the set of layers comprises a first dielectric unit and a second dielectric unit, arranged at an interval and closely linked, wherein the first dielectric unit is located at a position directly opposite to the first common electrode, and the second dielectric unit is located at a position directly opposite to the pixel electrode; and the dielectric constant of the first dielectric unit is greater than that of the second dielectric unit.

10. The liquid crystal display according to claim 9, wherein, a width of the first dielectric unit is consistent with a width of the second dielectric unit.

11. The liquid crystal display according to claim 9, wherein the structure of the set of layers being different at a position directly opposite to the first common electrode from that at a position directly opposite to the pixel electrode comprises a case in which:
   on the second common electrode in the set of layers, there is formed with a slit, and the slit is located at a position directly opposite to the pixel electrode.

12. The liquid crystal display according to claim 11, wherein a width of the slit is consistent with a width of the pixel electrode.

13. The liquid crystal display according to claim 10, wherein the structure of the set of layers being different at a position directly opposite to the first common electrode from that at a position directly opposite to the pixel electrode comprises a case in which:
   on the second common electrode in the set of layers, there is formed with a slit, and the slit is located at a position directly opposite to the pixel electrode.

14. The liquid crystal display according to claim 13, wherein a width of the slit is consistent with a width of the pixel electrode.

15. The liquid crystal display according to claim 9, wherein the structure of the set of layers being different at a position directly opposite to the first common electrode from that at a position directly opposite to the pixel electrode comprises a case in which:
   the second common electrode in the set of layers is in a concave-convex shape, wherein a distance between a concave-shaped portion of the second common electrode and the first substrate is smaller than a distance between a convex-shaped portion of the second common electrode and the first substrate; and the concave-shaped portion of the second common electrode is located at a position directly opposite to the first common electrode, and the convex-shaped portion of the second common electrode is located at a position directly opposite to the pixel electrode.

16. The liquid crystal display according to claim 15, wherein a width of the concave-shaped portion of the second common electrode is consistent with a width of the first common electrode.

17. The liquid crystal display according to claim 10, wherein the structure of the set of layers being different at a position directly opposite to the first common electrode from that at a position directly opposite to the pixel electrode comprises a case in which:
   the second common electrode in the set of layers is in a concave-convex shape, wherein a distance between a concave-shaped portion of the second common electrode and the first substrate is smaller than a distance between a convex-shaped portion of the second common electrode and the first substrate; and the concave-shaped portion of the second common electrode is located at a position directly opposite to the first common electrode, and the convex-shaped portion of the second common electrode is located at a position directly opposite to the pixel electrode.

18. The liquid crystal display according to claim 17, wherein a width of the concave-shaped portion of the second common electrode is consistent with a width of the first common electrode.

\* \* \* \* \*